United States Patent
Rakshit et al.

(10) Patent No.: US 10,814,977 B2
(45) Date of Patent: Oct. 27, 2020

(54) BACKUP RESCUE NOTIFICATION FROM DEEP SEA

(71) Applicant: International Business Machines Corporation, Armonk, NY (US)

(72) Inventors: Sarbajit K. Rakshit, Kolkata (IN); Siddharth K. Saraya, Burdwan (IN)

(73) Assignee: International Business Machines Corporation, Armonk, NY (US)

( * ) Notice: Subject to any disclaimer, the term of this patent is extended or adjusted under 35 U.S.C. 154(b) by 275 days.

(21) Appl. No.: 15/922,214

(22) Filed: Mar. 15, 2018

(65) Prior Publication Data

US 2019/0283870 A1 Sep. 19, 2019

(51) Int. Cl.
*B64C 39/02* (2006.01)
*B63B 49/00* (2006.01)
*G05D 1/00* (2006.01)

(52) U.S. Cl.
CPC ............ *B64C 39/024* (2013.01); *B63B 49/00* (2013.01); *G05D 1/0027* (2013.01); *B64C 2201/08* (2013.01); *B64C 2201/127* (2013.01); *B64C 2201/141* (2013.01)

(58) Field of Classification Search
None
See application file for complete search history.

(56) References Cited

U.S. PATENT DOCUMENTS

| 8,612,129 | B2 | 12/2013 | Gagliardi et al. |
| 9,443,207 | B2 | 9/2016 | Przybylko et al. |
| 2005/0051667 | A1* | 3/2005 | Arlton ............... G08B 13/19621 244/17.11 |
| 2011/0168838 | A1* | 7/2011 | Hornback ............. B64C 39/028 244/63 |

(Continued)

FOREIGN PATENT DOCUMENTS

| WO | 2013/123944 | 8/2013 | |
| WO | WO-2016203322 A2 * | 12/2016 | ........... B64C 39/024 |

OTHER PUBLICATIONS

Queensland Government; Distress signals, flares and emergency beacons (Maritime Safety Queensland); © The State of Queensland (Department of Transport and Main Roads) 2010-2018; http://www.msq.qld.gov.au/Safety/Distress-signals.aspx; last updated Sep. 15, 2017; printed Mar. 13, 2018; 4 pages.

(Continued)

*Primary Examiner* — Abdhesh K Jha
(74) *Attorney, Agent, or Firm* — Aaron N. Pontikos

(57) ABSTRACT

A ship distress system that uses a location system associated with the ship and an unmanned aircraft in communication with the location system that continuously receives the location of the ship. The unmanned aircraft can be deployed from a launcher into the direction of potential rescuers so that the unmanned aircraft can provide the location of the ship in distress. The unmanned aircraft is launched in a collapsed position and then unfolds into an extended position after kinetic energy from the launch is lost to maximize (Continued)

the speed and distance that the unmanned aircraft can cover. The unmanned aircraft can includes a camera to search for and identify any third parties that can effect a rescue and is programmed to search for and communicate with a potential rescue vessels or bases after being deployed into the air.

16 Claims, 3 Drawing Sheets

(56) References Cited

U.S. PATENT DOCUMENTS

| | | | |
|---|---|---|---|
| 2017/0092109 A1* | 3/2017 | Trundle | B64D 47/04 |
| 2018/0170510 A1* | 6/2018 | Brock | B64C 39/024 |

OTHER PUBLICATIONS

OTEN Maritime Studies—Maritime Training for GPH, Coxswain, Master, Deck Watchkeeper and Marine Engine Driver (MED) qualifications; Rule 37—Distress Signals; http://www.otenmaritime.com/international-collision-regulations/part-d—sound-and-light-signals/rule-37—distress-signals; printed Mar. 13, 2018; 2 pages.
Mythbusters: The Explosive Exhibition; Dodge a Bullet; http://www.mythbusterstheexhibition.com/science-content/dodge-a-bullet/; © 2018DiscoveryCommunications,LLC; printed Mar. 13, 2018; 5 pages.
Anthony, Sebastian, Micro-LED LiFi: Where every light source in the world is also TV, and provides gigabit internet access; Feb. 1, 2013, © 1996-2018 Ziff Davis, LLC; http://www.extremetech.com/extreme/147339-micro-led-lifi-where-every-light-source-in-the-world-is-also-tv-and-provides-gigabit-internet-access; printed Mar. 13, 2018; 7 pages.
How Does Li-Fi Work?; Axrtek Li-Fi Data Solutions; 5 G Wireless Internet; AXRTEC © 2014; http://www.axrtek.com/how-does-liFi-work.html; printed Mar. 13, 2018; 1 page.
Wikipedia; Projectile Motion; https://en.wikipedia.org/wiki/Trajectory_of_a_projectile; last edited Mar. 5, 2018; printed Mar. 13, 2018; 14 pages.
Szoldra, Paul; Business Insider UK; High-tech pirates hacked a shipping company to figure out the perfect vessels to plunder; Mar. 1, 2016; http://uk.businessinsider.com/pirates-hacked-vessels-2016-3?r=US&IR=T; Printed Mar. 13, 2018; 3 pages.
Heinrich,Aaron; World's first jet-powered, 3D-printed UAV debuts at Dubai Airshow; © GIZMAG PTY LTD 2018; http://www.gizmag.com/worlds-largest-fastest-3d-printed-uav/40293/; Printed Mar. 13, 2018; 6 pages.
Atherton, Kelsey D.; Crowdfund a Flying Jet-Powered Drone—Today a drone, tomorrow a rocket replacement?; Popular Science; Jan. 6, 2015; http://www.popsci.com/crowdfund-flying-quadjet-drone; Copyright © 2018 Popular Science; printed Mar. 13, 2018; 2 pages.
Allain, Rhett; Spring loaded gun. How high does the ball go?; YouTube; Published Jul. 11, 2011; https://www.youtube.com/watch?v=hJRt5hAJN0U; Printed Mar. 13, 2018; 3 pages.
French, Sally; The Drone Girl; 3 Drones That Happened Because of Kickstarter; Jul. 8, 2014; http://thedronegirl.com/2014/07/08/3-drones-that-happened-because-of-kickstarter/: printed Mar. 13, 2018; 3 pages.
Your Throw and Go Flying Camera; https://www.lily.camera/; © 2015 Lily Robotics, Inc., San Francisco, CA; printed May 31, 2016; 3 pages.
People's Daily Online; A4 paper-size foldable drone to reach market; Jul. 20, 2015; http://en.people.cn/n/2015/0720/c98649-8922915.html; Copyright by People's Daily Online; printed Mar. 13, 2018; 3 pages.
FPVguy—Trusted Drone Reviews; The NEW ProDrone—There is a new folding drone in town; Nov. 30, 2015; http://www.fpvguy.com/2015/11/pro-drone-1.html; printed Mar. 13, 2018; 9 pages.
Mastering Physics Solutions: Crossing a River | Mastering Physics Solutions; Jan. 15, 2012—Chapter 03—Motion in Two Dimensions; http://www.masteringphysicssolutions.net/mastering-physics-solutions-crossing-a-river/; printed Mar. 13, 2018; 7 pages.
Wikipedia; Galileo's Leaning Tower of Pisa experiment; page last edited on Feb. 12, 2018; https://en.wikipedia.org/wiki/Galileo%27s_Leaning_Tower_of_Pisa_experiment; printed Mar. 13, 2018; 4 pages.
Desert Wolf—Surveillance Solutions; BAT Drones; BAT Surveillance Drones; http://www.desert-wolf.com/dwc/index.php/aerial-surveillance/bat-drones; © Desert Wolf Consulting 2016; printed Jun. 1, 2016; 4 pages.
Projectile Motion Calculator; http://www.mrmont.com/teachers/physicsteachershelper-proj.html; printed Mar. 13, 2018; 1 page.
Kinematics—A to Z of Physics; Kinematics Problems—Bodies in vertical motion; https://gyaunnrraje.wordpress.com/category/kinematics/; printed Jun. 1, 2016; 21 pages.
Bi, Frank; The Verge—ProDrone's Byrd drone can be folded into the size of an iPad—a drone you can keep in your backpack or purse; Jan. 9, 2016; http://www.theverge.com/2016/1/9/10739826/prodrone-byrd-drone-portability-quadcopter-ces-2016; Printed Mar. 14, 2018; 4 pages.
Griffiths, Sarah, Daily Mail—The indestructible drone: Ball-shaped aircraft BOUNCES around buildings and disaster zones; Feb. 10, 2015; http://www.dailymail.co.uk/sciencetech/article-2947472/The-indestructible-drone-Ball-shaped-aircraft-BOUNCES-buildings-disaster-zones.html; printed Jun. 1, 2016; 25 pages.
RC-Drones; Phoenix Flight Gear Xtreme CarbonSpyder Foldable FPV Micro Frame; http://www.rc-drones.com/Phoenix-Flight-Gear-Xtreme-CarbonSpyder-Foldable-FPV-Micro-Frame_p_564.html; Copyright 2016 RC-Drones.com; printed Jun. 1, 2016; 10 pages.
Kim, Dong Hyun, Jun Hwan Huh, and Jong-Deok Kim; Information Science and Application (ICISA) 2016; Editors—Kuinam J. Kim, Nikolai Joukov; © Springer Science+Business Media Singapore 2016; Design and Implementation of Drone for Wideband Communication and Long-range in Maritime (pp. 219-225); 10 pages.

* cited by examiner

BACKUP RESCUE NOTIFICATION FROM DEEP SEA

BACKGROUND

The present invention relates to maritime distress systems and, more specifically, to a method and system for providing rescue notification for a ship.

When experiencing critical conditions, a ship sailing in deep sea has very limited options for communicating that it is in distress. This problem is exacerbated if the ship has, as a result of the conditions, lost its conventional modes of communication. Conventionally, the only backup in these circumstances is for the ship to launch flares to indicate that it is in distress. The effective range of flares are very limited, however, as they any nearby ships or coastal area must be within sight of the flare (within 25 to 35 nautical miles) and must be looking in the proper direction to register the distress signal. Accordingly, there is a need in the art for an additional backup approach that provides for more reliable and faster communications so that rescue operations can be commenced immediately.

SUMMARY

In one embodiment, the ship distress system has a launcher configured to be positioned on a ship and an unmanned aircraft associated with the launcher for being deployed into the air therefrom and having data storage for recording the location of the ship and a wireless communication system for broadcasting the location of the ship to a third party. The wireless communication system can be a Light Fidelity (Li-Fi) system. The unmanned aircraft may include a camera and be programmed to search video captured by the camera to identify any potential third party rescuers. The unmanned aircraft is configured to unfold from a collapsed position when associated with the launcher into an extended position when deployed into the air. Once deployed, the unmanned aircraft is programmed to search for a potential rescue vessel after being deployed into the air. A plurality of the unmanned aircrafts may be associated with a corresponding plurality of the launchers to improve the distribution of unmanned aircrafts and increase the likelihood of finding a potential rescuer.

In another embodiment, a method of notifying that a ship is in distress comprising using a launcher to deploy an unmanned aircraft from a ship, wherein the unmanned aircraft is configured to broadcast the location of the ship to a third party after being launched. The unmanned aircraft includes a wireless communication system that is configured to broadcast the location of the ship to the third party after being launched and the wireless communication system can be a Light Fidelity (Li-Fi) system. The unmanned aircraft may further includes a camera and be programmed to search the video captured by the camera to locate potential rescuers. The unmanned aircraft is configured in a collapsed position when launched and unfolds into an extended position after being launched, such as when any kinetic energy from being launched has been exhausted. Once launched, the unmanned aircraft searches for third party rescuers.

In a further embodiment, the ship distress system includes a location system associated with the ship that continuously provides the location of the ship, an unmanned aircraft in communication with the location system for continuously receiving the location of the ship and having a wireless communication system for broadcasting the location of the ship, and a launcher positioned on the ship that is configured to deploy the unmanned aircraft from the ship in response to user activation. The wireless communication system is a Light Fidelity (Li-Fi) system. The unmanned aircraft further includes a camera and is programmed to search video captured by the camera to identify any third parties that can effect a rescue. The unmanned aircraft unfolds from a collapsed position when associated with the launcher into an extended position when deployed into the air and is programmed to search for a potential rescue vessel after being deployed. A plurality of unmanned aircrafts may also be launched from a corresponding plurality of launchers with the plurality of launchers directed by the location to target potential third party rescuers.

DETAILED DESCRIPTION

Figure 1:
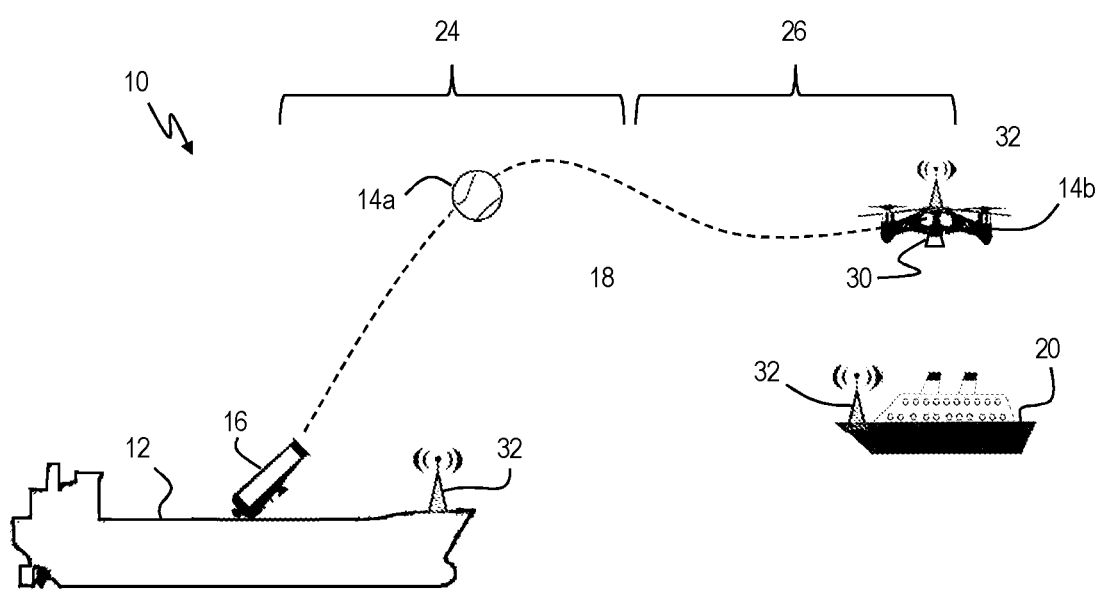
FIG. 1 is a schematic of a backup rescue notification system.

Referring to the figures, wherein like numerals refer to like parts throughout, there is seen in FIG. 1 a system 10 for communicating that a ship is in distress. System 10 is outfitted on a ship 12 and comprises an unmanned aircraft 14 that is stored in or nearby a launch mechanism 16 in a collapsed state that can be launched by launch mechanism 16. Unmanned aircraft 14 is preferably configurable between a collapsed state 14a that allows for easy launching, and an extended state 14b, where unmanned aircraft 14 can fly until its own power and control. Unmanned aircraft 14 can have spring or hydraulic operated mechanism for transitioning from the collapsed to the extended configurations that are activated at a point 18 where by unmanned aircraft 14 begins to free fall after kinetic energy from the launch has been exhausted. Alternatively, or in addition thereto, unmanned aircraft 14 may be powered by jets to reduce or avoid the need for a kinetic launcher and to ensure that unmanned aircraft 14 locates a potential rescue ship 20 or land based rescue base 22 quickly.

Launch mechanism 16 may comprise a spring operated launcher, electromagnetic launcher, or similar arrangement. Launch mechanism 16 can launch collapsed unmanned aircraft 14 with substantial kinetic energy so it will have a high initial speed along a path for a first portion 24. The projection angle is selected so that unmanned aircraft 14 will travel as far as possible within a short time using the initial kinetic energy from the launch. Once the initial kinetic launch is exhausted, unmanned aircraft 14 can unfold and fly under its own power over a second portion 26 until a potential rescue ship 20 or land based rescue base 22 is found.

Figure 2:
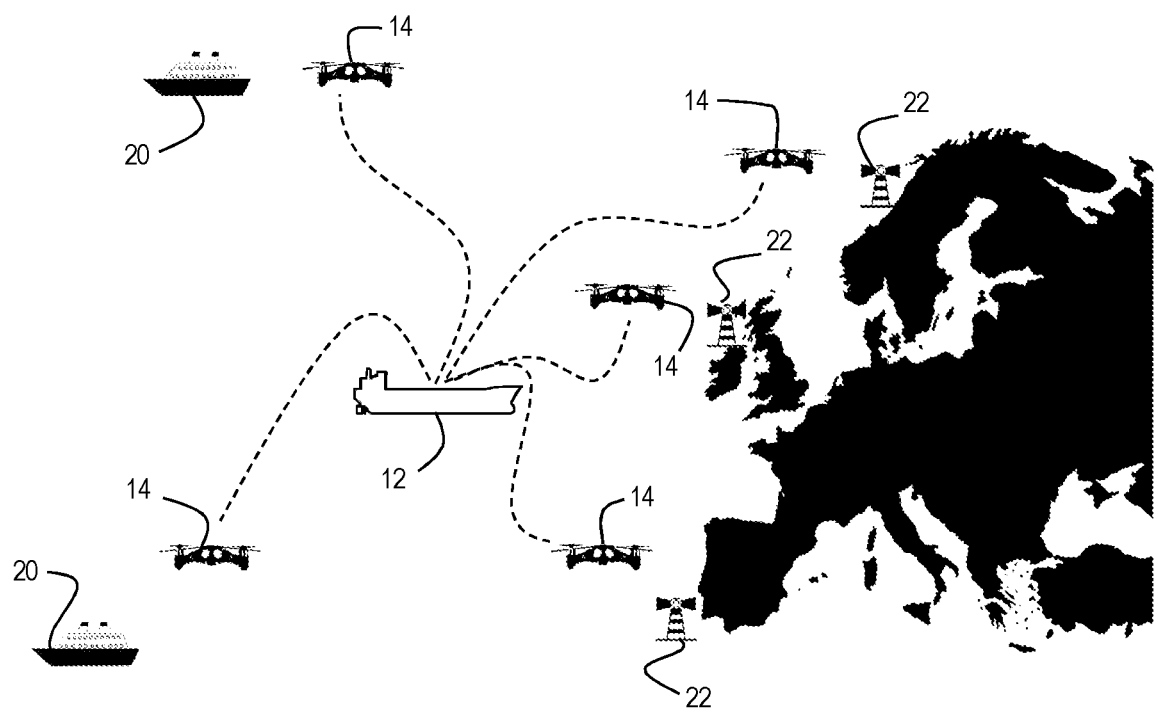
FIG. 2 is a schematic of a wide area launch from in a backup rescue notification system.
Figure 3:
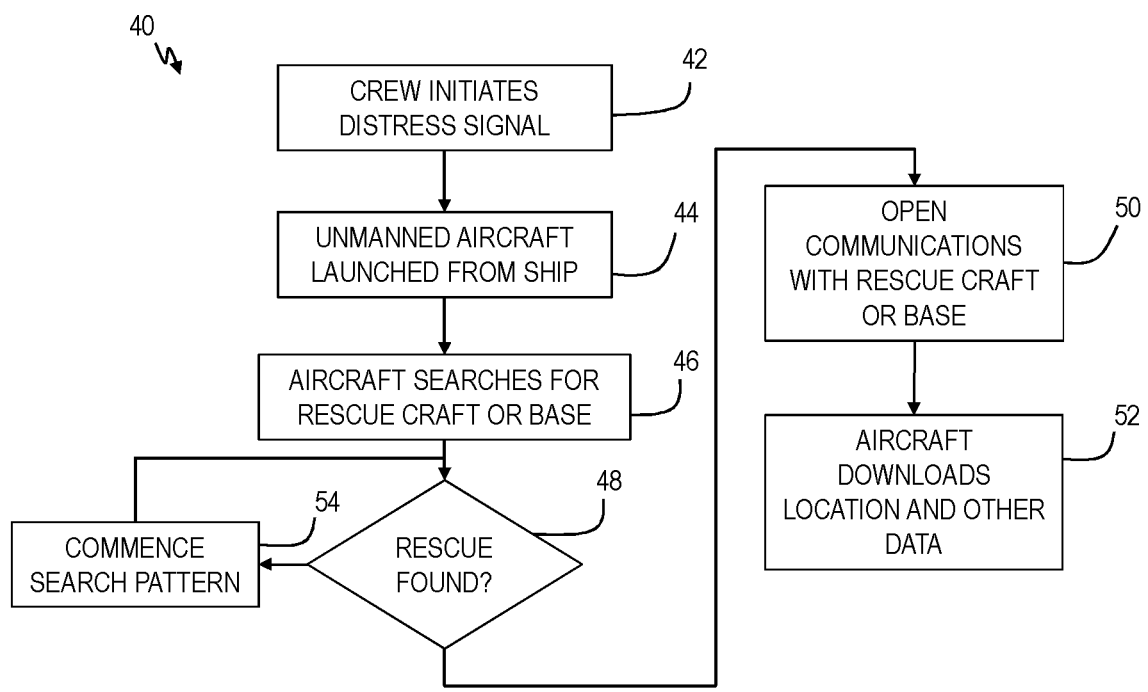
FIG. 3 is a method of initiating a rescue using a backup rescue notification system.

As seen in FIG. 2, ship 12 can launch multiple unmanned aircrafts 14 in various directions to improve the likelihood that any unmanned aircraft 14 will encounter an acceptable rescue craft 20 or land based rescue base 22. The launch direction may also be selected based on the location of the nearest known potential rescue ship 20 or land based rescue base 22. Prior to deployment, system 10 can be in continuous communication with ship 12 to receive ongoing ship location updates for use by unmanned aircraft 14. Unmanned aircraft 14 may also be provided with data regarding an explanation of the problem leading to the distress, the ship's log, crew and passenger information, specific messages, etc. After deployment, unmanned aircraft 14 can broadcast the requisite information to rescue vessel 20 or land based rescue base 22. Unmanned aircraft 14 can also receive real time updates on potential rescue ship 20 or land based rescue base 22. For example, when the communication network is available, ship 12 will communicate with nearby ships and determine their direction of movement, speed, land position, etc. When no communications are available, system 10 can retrieve the last known positions, directions of movement, and speed of all nearby ships or land bases. Based on elapsed time, system 10 can predict the most likely position of all potential rescue ships 20 or land based rescue bases 22. Based on this information, system 10 can determined the best direction to launch unmanned aircraft 14 and at what speed if launch mechanism 16 is variable.

Unmanned aircraft 16 is outfitted with a camera 30 and includes onboard navigation and control system that can analyze the surroundings after deployment to identify location and the presence of any other water craft or populated land areas. Unmanned aircraft 14 may further include a Light Fidelity (Li-Fi) system 32 that can transmit and receive from a corresponding Li-Fi system 32 on board ship 12 as well as Li-Fi systems 32 located on a potential rescue ship 20 or land based rescue base 22. It should be recognized that unmanned aircraft 14 could also be outfitted with conventional communication systems, such as radio, Wi-Fi, etc. Once a potential rescue ship 20 or land based rescue base 22, unmanned aircraft 14 can establish a communication link between a potential rescue ship 20 or land based rescue base 22 and ship 12. Unmanned aircraft 14 can also provide a video feed using camera 30.

A method of broadcasting a ship in distress 40 may thus commence with initiation of a distress signal 42 by the appropriate crew member, such as the captain, of ship 12. Unmanned aircraft 14 is then launched or ejected from ship 12. Once deployed, unmanned aircraft 14 then searches the immediate area to determine whether a potential rescue craft 20 or land based rescue base 22 is in range. If a check 48 determines so, unmanned aircraft 14 opens communications 50 with rescue craft 20 or land based rescue base 22. Unmanned aircraft 14 then downloads the relevant data 52 needed for rescue craft 20 or land based rescue base 22 using the communication system 32, such as Li-Fi, to begin rescue operations. If no rescue craft 20 or land based rescue base 22 are found at check 48, unmanned aircraft 14 commences a predetermined search pattern 54 until an acceptable rescue craft 20 or land based rescue base 22 is found. For example, unmanned aircraft 14 may be programmed to begin flying in a particular direction or pattern until rescue craft 20 or land based rescue base 22 is located, or unmanned aircraft 14 may be programmed to fly to the nearest rescue craft 20 or land based rescue operation 22 stored in memory and identified based on the last location coordinates provided by ship 12. Unmanned aircraft 14 continues to search until an acceptable rescue craft 20 or land based rescue base 22 are in range and it can establish communications 50 to accomplish a rescue.

System 12 may be used to provide a defense against third parties. When third parties board a vessel without authorization, they typically disable the various modes of communication on the ship and restrain the crew so that they are unable to communicate with rescuers. System 10 may be configured to automatically launch one or more unmanned aircrafts 14 in the event of a third party boarding, such as by automatically triggering based on cognitive modeling (data gathered from Biometric signals, facial pattern, image analysis, sensor network data etc.) that indicates that a boarding is underway or if the conventional ship communication systems are taken off-line.

What is claimed is:

1. A ship distress system, comprising:
    a launcher configured to be positioned on a ship; and
    an unmanned aircraft associated with the launcher for being deployed into the air therefrom and having data storage for recording the location of the ship and a wireless communication system for broadcasting the location of the ship to a third party,
    wherein the unmanned aircraft automatically transitions from a collapsed position when associated with the launcher to an extended position in response to detecting, after being deployed into the air, that the kinetic energy from the launch has been exhausted.

2. The system of claim 1, wherein the wireless communication system is a Light Fidelity (Li-Fi) system.

3. The system of claim 2, wherein the unmanned aircraft further includes a camera and is programmed to search video captured by the camera to identify any third parties that can effect a rescue.

4. The system of claim 1, wherein the unmanned aircraft is programmed to search for a potential rescue vessel after being deployed into the air.

5. The system of claim 4, further comprising a plurality of the unmanned aircrafts associated with a corresponding plurality of the launchers.

6. A method of notifying that a ship is in distress, comprising: deploying, via a launcher, an unmanned aircraft from the ship, wherein:
    the unmanned aircraft is configured to broadcast the location of the ship to a third party after being launched; and
    the unmanned aircraft automatically transitions from a collapsed position when associated with the launcher to an extended position in response to detecting, after being deployed into the air, that the kinetic energy from the launch has been exhausted.

7. The method of claim 6, wherein the unmanned aircraft includes a wireless communication system that broadcasts the location of the ship to the third party after being launched.

8. The method of claim 7, wherein the wireless communication system is a Light Fidelity (Li-Fi) system.

9. The method of claim 8, wherein the unmanned aircraft further includes a camera and is programmed to broadcast video over the communication system.

10. The method of claim 6, further comprising the step of having the unmanned aircraft search for a third party after being launched.

11. A ship distress system, comprising:
    a location system associated with a ship that continuously provides the location of the ship;
    an unmanned aircraft in communication with the location system for continuously receiving the location of the ship and having a wireless communication system for broadcasting the location of the ship; and
    a launcher positioned on the ship that is configured to deploy the unmanned aircraft from the ship in response to user activation,
    wherein the unmanned aircraft automatically transitions from a collapsed position when associated with the launcher to an extended position in response to detecting, after being deployed into the air, that the kinetic energy from the launch has been exhausted.

12. The system of claim 11, wherein the wireless communication system is a Light Fidelity (Li-Fi) system.

13. The system of claim 12, wherein the unmanned aircraft further includes a camera and is programmed to search video captured by the camera to identify any third parties that can effect a rescue.

14. The system of claim 11, wherein the unmanned aircraft is programmed to search for a potential rescue vessel after being deployed into the air.

15. The system of claim 14, further comprising the step of launching a plurality of unmanned aircrafts from a corresponding plurality of launchers.

16. The system of claim 15, wherein the plurality of launchers are targeted by the location system toward a plurality of potential third party rescuers.

* * * * *